United States Patent [19]

Paardekooper et al.

[11] Patent Number: 4,741,906
[45] Date of Patent: May 3, 1988

[54] COMPOSITE MEAT PRODUCT AND METHOD FOR THE MANUFACTURE THEREOF

[75] Inventors: Ernst J. C. Paardekooper, Sint Michielsgestel; Gerrit Wijngaards, Driebergen-Rijsenburg, both of Netherlands

[73] Assignee: Nederlandse Centrale Organisatie Voor Toegepast-Natuurwetenschappelijk Onderzoek, The Hague, Netherlands

[21] Appl. No.: 859,023

[22] Filed: May 2, 1986

[30] Foreign Application Priority Data

May 9, 1985 [NL] Netherlands ............... 8501333

[51] Int. Cl.⁴ .............................. A23L 1/31
[52] U.S. Cl. ........................ 426/59; 426/56; 426/574; 426/641; 426/646
[58] Field of Search ............. 426/59, 56, 272, 641, 426/646, 574, 513

[56] References Cited

U.S. PATENT DOCUMENTS

| | | | |
|---|---|---|---|
| 3,076,713 | 2/1963 | Maas | 99/107 |
| 3,449,124 | 6/1969 | Lipner | 426/646 X |
| 3,644,128 | 2/1972 | Lipner | 426/646 |
| 3,982,003 | 9/1976 | Mitchell | 426/574 X |
| 4,363,822 | 12/1982 | Kleptz | 426/513 |
| 4,377,597 | 3/1983 | Shapiro et al. | 426/641 |
| 4,436,759 | 3/1984 | Trilling | 426/574 X |
| 4,464,404 | 8/1984 | Ueno | 426/574 X |

FOREIGN PATENT DOCUMENTS 876090 10/1981 U.S.S.R. ............... 426/574
1053805 11/1983 U.S.S.R. ............... 426/574

OTHER PUBLICATIONS

D. G. Siegel, "Gel Structure of Nonmeat Proteins as Related to Their Ability to Bind Meat Pieces", Journal of Food Science, vol. 44, pp. 1276–1284, 1979.
Food Science & Technology Abstracts, No. 85-0-3-50027, citing T. F. Chirkina et al., "Evaluation of a Food Additive Based on Blood Proteins", Voprosy Pitanya, No. 2, pp. 54–55, 1984.
Food Science & Technology Abstracts, No. 83-1-2-S2157, citing D. Artioli, "Use of Dried Blood Plasma in Cooked Pork Products", Annali Della Facolta Di Medicina Veterinari, Universita Di Parma, vol. 1, pp. 229–310, 1981.
J. J. MacFarlane et al., "Binding of Meat Pieces: A Comparison of Myosin, Actomyosin and Sarcoplasmic Proteins as Binding Agents", Journal of Food Science, vol. 42, pp. 1603–1605, 1977.

Primary Examiner—Kenneth M. Schor
Attorney, Agent, or Firm—Brumbaugh, Graves, Donohue & Raymond

[57] ABSTRACT

The invention relates to a composite meat product consisting of meat parts which are bonded to each other by means of a gel consisting essentially of fibrin.

The invention relates further to a method for the manufacture of composite meat products in which raw meat parts are mixed with a solution containing fibrinogen in a concentration of at least 10 mg/ml and a catalytic quantity of thrombin, the mixture is given a desired shape and is kept in said shape until the raw meat parts are bonded to each other.

13 Claims, No Drawings

COMPOSITE MEAT PRODUCT AND METHOD FOR THE MANUFACTURE THEREOF

The invention relates to a composite meat product consisting of meat parts which are bonded to each other by means of a protein gel. The invention also relates to a method for the manufacture of composite meat products in which raw meat parts are mixed with a protein solution and the mixture is given a desired shape.

Composite, for the most part restructured, meat products and methods for the manufacture thereof are known. These involve the use of pieces of meat which are produced during the carving out of carcase parts in the meat-processing industry or in butchers' shops. These pieces are too small to be sold separately, but the quality thereof is usually so good that the processing of such meat parts into minced meat is not economically justified but the production of more highly valued, restructured products therefrom is.

Such meat products, which consist of meat parts which are bonded to each other by means of a protein gel, are, for example, known from U.S. Pat. Nos. 3,076,713 and 4,377,597. It is reported therein, for example, that meat parts and a fairly large quantity of salt are mixed with each other for a long time. Under these circumstances a sticky exudate is produced on the surface of the meat. If the mixture, placed in a mould, is heated, the protein in the exudate coagulates, as a result of which a coherent meat product is formed. J. Food Science 42 (1977), pages 1603–1605 deals with the bonding of small pieces of meat by means of a gel consisting of the meat proteins myosin and/or actomyosin, which gel is also obtained by heating.

A method for the production of restructured meat products, in which raw meat parts are comminuted by machine and then mixed with a protein solution and the mixture is given a desired shape is, for example, known from U.S. Pat. No. 4,363,822. According to the method described therein, small pieces of raw meat, together with the exudate obtained therefrom, are pressed into a mould and frozen. The product is marketed in the frozen state.

The present invention relates to a composite meat product, the meat parts of which are raw meat parts which are bonded to each other by means of a gel essentially consisting of fibrin. The bonding of the separate meat parts in the present meat product is not produced only after the meat product has been heated, but is present already in the raw meat product without recourse having to be made to (deep) freezing.

The invention also relates to a method for the manufacture of composite meat products in which raw meat parts are mixed with a protein solution and the mixture is given a desired shape. In the method according to the invention a protein solution is used which contains fibrinogen in a concentration of at least 10 mg/ml and a catalytic quantity of thrombin. The mixture is then kept in the desired shape until the raw meat particles have been bonded to each other.

Although the presence of fibrinogen and thrombin in the protein solution is sufficient to form a gel, it is desirable that the protein solution contains also catalytic quantities of transaminase (fibrin-stabilizing factor or blood-clotting factor XIII) and calcium ions in order to obtain a good bonding of the raw meat parts. The fibrin-stabilizing factor effects, in the presence of calcium ions, a linking of fibrin molecules among themselves and of fibrin to collagen molecules in the meat, as a result of which a stronger gel is produced and a good bonding is promoted. Calcium ions are naturally present in sufficiently high concentration in blood plasma and meat for the above-named linking of molecules. Mostly, however, calcium-bonding components are used as an anti-clotting agent for the blood from which fibrinogen is isolated, and for the blood, the plasma of which is used as the solvent medium for fibrinogen. Depending on the type and the concentration of a calcium-bonding component which is present the free calcium ion concentration may then be fairly low during the bonding of meat according to the method of the present invention. Therefore addition of calcium ions as a calcium salt to the protein solution may then take place for the sake of certainty. Because fibronectin is also involved in the linking by means of the fibrin-stabilizing factor, the presence of this substance in the protein solution may contribute to the bonding of the gel to the meat parts.

The fibrinogen concentration in the protein solution is limited by the solubility of the fibrinogen, which is approximately 80 mg/ml. To prevent precipitates or obstructions in the pipes of the equipment used, it is desirable to use a concentration of at most 60% of the saturation concentration. A concentration of 40–45 mg/ml of fibrinogen gives excellent results.

To the protein solution a catalytic quantity of the enzyme thrombin is added. The bonding proceeds the more rapidly, the higher the thrombin concentration is. In general the protein solution should contain at least 1 NIH unit of thrombin per 100 mg of fibrinogen. Preferably a protein solution having a thrombin concentration of 3–6 NIH units per 100 mg of fibrinogen is used. In this case the time for gel formation is approximately 5 minutes, while maximum bonding is achieved after a few hours.

The protein solution may be a solution of fibrinogen and thrombin and optionally the other above-named substances in water, in a salt solution or in a buffer. The salt solution and buffer may contain at most 1 mol of common salt per litre. If a buffer solution is used, this may be, for example, a phosphate buffer with a pH of at least 5, preferably of 7.0–8.0.

It is advantageous to use blood plasma as the protein solution with a fibrinogen concentration increased to at least 10 mg/ml. The use of plasma is advantageous because plasma contains not only fibrinogen but also other substances which have an influence on the conversion of fibrinogen to fibrin and the linking of the fibrin formed to the bonding tissue (collagen). Thus, plasma contains the fibrin-stabilizing factor already mentioned above which links fibrin molecules to each other and to the connective tissue. The animal species from which the plasma is derived may be the same as that of the meat to be bonded but this is not necessary for the bonding.

In performing the method according to the invention the raw meat parts are simply mixed with the protein solution and the whole is arbitrarily shaped.

By means of the method according to the invention a high-grade product can be made from small pieces of raw meat, the quality of which is too high to process them into minced meat. In this connection it is possible to start from one type of meat, but also from a mixture, such as barbecue meat, and to bond it to form one raw meat part. Another important application of the present invention is in the manufacture of rolled meats. If the parts of a rolled meat to be bonded to each other are treated in the raw state with the protein solution described above a good bonding is obtained, which is also retained after roasting. In this case a rolled meat is obtained which in the roasted state does not fall apart on cutting.

The fibrinogen required in the method according to the invention is a commercial product which is prepared from animal plasma by means of precipitation. The conditions for precipitation are created by adjusting varying temperatures, alcohol concentrations, salt concentrations and/or pH values. The precipitates are obtained by filtration or centrifugation. The fibrinogen may be derived from the same species of animal as that of the meat parts to be bonded, but this is not essential for the bonding.

The thrombin is also a commercial product which is prepared from mammalian plasma, in particular bovine plasma.

The method according to the invention may be performed at temperatures above freezing point to the temperature at which the thrombin and/or fibrinogen is denatured, in general at a temperature of 0°-55° C.

The term "meat parts" also means game and fowl parts as well as fish parts.

The dimensions of the meat parts to be treated are not important. In general the invention will be applied to relatively small meat parts which cannot be sold separately.

The invention is explained by reference to the following examples.

EXAMPLE I

A fibrinogen solution and a thrombin solution were used for the bonding of small, raw meat parts having a weight of 20 to 50 gram and derived from pig shoulder muscles. The fibrinogen solution contained 50 mg of fibrinogen per ml and consisted of bovine blood plasma in which 60 mg of fibrinogen powder (total protein content 87%, fibrinogen content 72.3%) per ml was dissolved. The thrombin solution was made by dissolving thrombin powder in 0.6M calcium chloride solution to give a concentration of 40 NIH units of thrombin per ml.

A mixture of 180 ml of fibrinogen solution and 12.6 ml of thrombin solution was used for bonding 3 kg of the above-named meat parts. The small pieces of meat, having a temperature of 10° C., were mixed for this purpose with the fibrinogen/thrombin solution and transferred within 5 minutes to a trough-shaped container (30×10×12 cm), air inclusions between the small pieces being avoided as much as possible. The whole was set aside for a night in a cooled room (0° to 4° C.) in order to obtain a good gel and bonding. The composite and shaped meat product was removed on the following day from the container and cut into slices 1.5 to 2 cm thick. The bonding in these slices was sufficiently strong and stable for further processing as a fresh meat product.

EXAMPLE II

The bonding method for fresh meat using fibrinogen and thrombin was used in the preparation of rolled beef. After removal of membranes of the covering of the upper rump which was still present, the said muscle meat was salted and seasoned. The surface was then moistened with the fibrinogen/thrombin solution as described in Example I. The part of the meat which was on the outside after rolling up was not moistened. Approximately 125 ml of bonding medium was used for 2 kg of meat.

After rolling up, tightly binding with string, and allowing to bond at 0° to 4° C. for one night, a strongly bonded rolled meat was obtained which after roasting could be cut into well bonded slices. This applied both to thin slices (1 to 2 mm) and to thick slices (1 to 1.5 cm).

We claim:

1. In a method for manufacturing composite meat products which comprises mixing raw meat parts with a gel-forming substance and shaping the mixture into a desired shape, the improvement comprising the steps of
   mixing the raw meat parts with a fibrin gel-forming protein solution which contains fibrinogen in a concentration of 10 to 80 mg per ml and an amount of thrombin effective to catalytically convert the fibrinogen into a fibrin gel,
   molding the mixture into a desired shape, and then maintaining the mixture in the desired shape at a temperature between 0 to 55 degrees C. to convert the fibrinogen into a fibrin gel, such that the raw meat parts become bonded to each other by the fibrin gel which is formed and such that said composite meat product is formed.

2. Method according to claim 1 in which the fibrin gel-forming protein solution additionally contains a fibrin-stabilizing factor and calcium ions.

3. Method according to claim 2 in which the fibrin stabilizing factor is transaminase.

4. Method according to claim 1 in which the fibrinogen concentration is between 40 to 50 mg per ml.

5. Method according to claim 1 in which the catalytically effective amount of thrombin is at least 1 NIH Unit per 100 mg of fibrinogen.

6. Method according to claim 1 in which the catalytically effective amount of thrombin is between 3 to 6 NIH Units per 100 mg of fibrinogen.

7. Method according to claim 2 in which the fibrin gel-forming protein solution is blood plasma to which fibrinogen has been added to provide a fibrinogen concentration of at least 10 mg per ml.

8. Method according to claim 2 in which the fibrin gel-forming protein solution contains water as a solvent.

9. Method according to claim 2 in which the fibrin gel-forming protein solution contains a salt solution as a solvent.

10. Method according to claim 9 in which the salt solution is a solution of NaCl in a concentration no greater than 1M.

11. Method according to claim 9 in which the salt solution is a buffer having a pH of at least 5.

12. Method according to claim 9 in which the salt solution is a buffer having a pH between 7.0 and 8.0.

13. Method according to claim 1 in which the mixture is maintained at a temperature between 0 and 4 degrees C. to allow the meat parts to become bonded to each other by the fibrin gel which is formed.

* * * * *